US010103885B2

(12) United States Patent
Davis

(10) Patent No.: US 10,103,885 B2
(45) Date of Patent: Oct. 16, 2018

(54) METHOD AND SYSTEM FOR DISTRIBUTED CRYPTOGRAPHIC KEY PROVISIONING AND STORAGE VIA ELLIPTIC CURVE CRYPTOGRAPHY

(71) Applicant: MasterCard International Incorporated, Purchase, NY (US)

(72) Inventor: Steven Charles Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 162 days.

(21) Appl. No.: 15/001,775

(22) Filed: Jan. 20, 2016

(65) Prior Publication Data

US 2017/0207917 A1 Jul. 20, 2017

(51) Int. Cl.
| | |
|---|---|
| H04L 29/06 | (2006.01) |
| H04L 9/30 | (2006.01) |
| H04L 9/08 | (2006.01) |
| H04L 9/14 | (2006.01) |

(52) U.S. Cl.
CPC .......... *H04L 9/3066* (2013.01); *H04L 9/0841* (2013.01); *H04L 9/14* (2013.01); *H04L 63/045* (2013.01); *H04L 63/06* (2013.01); *H04L 63/061* (2013.01); *H04L 63/062* (2013.01)

(58) Field of Classification Search
CPC ................. H04L 9/3066; H04L 63/045; H04L 63/061–63/063; H04L 9/0811
USPC ........................................................ 713/171
See application file for complete search history.

(56) References Cited

U.S. PATENT DOCUMENTS

| 2015/0213433 A1* | 7/2015 | Khan ................. G06Q 20/3227 705/71 |
| 2015/0310436 A1* | 10/2015 | Lakshmanan .......... G06Q 20/40 705/71 |

FOREIGN PATENT DOCUMENTS

WO 0079768 A1 8/2000

OTHER PUBLICATIONS

International Search Report and Written Opinion issued by the International Search Authority dated Apr. 20, 2017 in corresponding PCT Application No. PCT/US2017/012437 (16 pages).

(Continued)

*Primary Examiner* — Dao Q Ho
*Assistant Examiner* — Angela R Holmes
(74) *Attorney, Agent, or Firm* — Buchanan Ingersoll & Rooney PC

(57) ABSTRACT

A method for distributing multiple cryptographic keys used to access data includes: receiving a data signal superimposed with an access key request, wherein the access key request includes at least a number, n, greater than 1, of requested keys; generating n key pairs using a key pair generation algorithm, wherein each key pair includes a private key and a public key; deriving an access private key by applying the private key included in each of the n key pairs to a key derivation algorithm; generating an access public key corresponding to the derived access private key using the key pair generation algorithm; and electronically transmitting a data signal superimposed with a private key included in one of the n key pairs for each of the n key pairs.

16 Claims, 6 Drawing Sheets

(56) References Cited

OTHER PUBLICATIONS

Steven Goldfeder et al: "We Securing Bitcoin wallets via threshold signatures", Jun. 3, 2014 (Jun. 3, 2014), XP055326412, Retrieved from the Internet: URL: http://www.cs.princeton.edu/stevenag/bitcoin_threshold_signatures.pdf [retrieved Dec. 6, 2016] the whole document (11 pages).
Rosario Gennaro et al: "Threshold-optimal DSA/ECDSA signatures and an application to Bitcoin wallet security", International Association for Cryptologic Research,, vol. 20160127:005717, Jan. 6, 2016 (Jan. 6, 2016), pp. 1-43, XP061019978 [retrieved on Jan. 6, 2016] the whole document (43 pages).

\* cited by examiner ated, by a generation module of the processing server, n key pairs using a key pair generation algorithm, wherein each key pair includes a private key and a public key; deriving, by a derivation module of the processing server, an access private key by applying the private key included in each of the n key pairs to a key derivation algorithm; generating, by the generation module of the processing server, an access public key corresponding to the derived access private key using the key pair generation algorithm; and electronically transmitting, by a transmitting device of the processing server, a data signal superimposed with a private key included in one of the n key pairs for each of the n key pairs.

METHOD AND SYSTEM FOR DISTRIBUTED CRYPTOGRAPHIC KEY PROVISIONING AND STORAGE VIA ELLIPTIC CURVE CRYPTOGRAPHY

FIELD

The present disclosure relates to the distribution of multiple cryptographic keys used to access data, specifically the use of elliptic curve cryptography to securely distribute a plurality of cryptography keys used to derive a single key for access of data necessitating the negotiation of data ownership by cryptograph key recipients.

BACKGROUND

In a world where the number of computing devices is in the billions, data is constantly being transferred. Data can be transferred from one computing device to another, from one computing device to many other computing devices, or from many computing devices to a single one. In many instances, the security of a data transfer may be as important as where the data is being transferred. For example, if data is secured properly such that only an intended party is able to view the data, the data may be made publicly available for easier access by the intended party. With a high level of security, the data may be safe from any entity other than the intended party despite the public accessibility. As a result, ensuring the security of data being transferred via public channels may be highly important.

However, such a prospect may be extremely difficult in instances where data is to be made available to a group of intended entities. For example, if a party wants to make publicly available data accessible for a group of four different people, the party may encrypt the data and provide keys suitable for accessing the data to each of the four different people. In such an instance, a compromise of any of the four keys may compromise the data being transferred, which leads to a significantly less secure situation. In order to maintain the highest level of security, it may be in the best interest of the party to only distribute a single key to access the data. However, the group of four people may be unable to identify which person is to receive the single key, or such an identification may be time consuming or otherwise inconvenient for the party.

Thus, there is a need for a technical solution for the transfer of data for accessibility by a plurality of entities via the use of a single access key. Furthermore, there is a need for a technical solution whereby the transferring party can provide data to each of the plurality of entities for negotiation of ownership by the entities without participation by the transferring party. In such an instance, the data may be transferred securely with a minimal likelihood of being compromised, and with access only being available to a single entity, which may be selected among the plurality of entities without requiring additional participation by the transferring party.

SUMMARY

The present disclosure provides a description of systems and methods for distributing multiple cryptographic keys to be used in the accessing of data.

A method for distributing multiple cryptographic keys used to access data includes: receiving, by a receiving device of a processing server, a data signal superimposed with an access key request, wherein the access key request includes at least a number, n, greater than 1, of requested keys; gener- A system for distributing multiple cryptographic keys used to access data includes: a transmitting device of a processing server; a receiving device of the processing server configured to receive a data signal superimposed with an access key request, wherein the access key request includes at least a number, n, of requested keys; a generation module of the processing server configured to generate n key pairs using a key pair generation algorithm, wherein each key pair includes a private key and a public key; and a derivation module of the processing server configured to derive an access private key by applying the private key included in each of the n key pairs to a key derivation algorithm. The generation module of the processing server is further configured to generate an access public key corresponding to the derived access private key using the key pair generation algorithm. The transmitting device of the processing server is configured to electronically transmit a data signal superimposed with a private key included in one of the n key pairs for each of the n key pairs.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A ledger of all transactions in conformance with one or more standards or conventions associated with the blockchain. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, a blockchain may be a ledger of currency transactions, where transactions recorded in the blockchain may include a destination address and a currency amount, such that the blockchain records how much currency is attributable to a specific address. In some such configurations, the blockchain may use a blockchain-based digital currency, which may be unique to the respective blockchain. In some instances, additional information may be captured, such as a source address, timestamp, etc. In some embodiments, a blockchain may also consist of additional, and in some instances arbitrary, data that is confirmed and validated by the blockchain network through proof of work and/or any other suitable verification techniques associated therewith. In some cases, such data may be included in the blockchain as part of transactions, such as included in additional data appended to transaction data. In some instances, the inclusion of such data in a blockchain may constitute a transaction. In such instances, a blockchain may not be directly associated with a specific digital, virtual, fiat, or other type of currency. A blockchain may be private, where only authorized systems or devices may access the blockchain, or may be public, where the blockchain may be accessible by any device or system. In either instance, the ability for devices or systems to add transactions to the blockchain may be limited.

System for Cryptographic Key Distribution Via Elliptic Curve Cryptography

Figure 1:
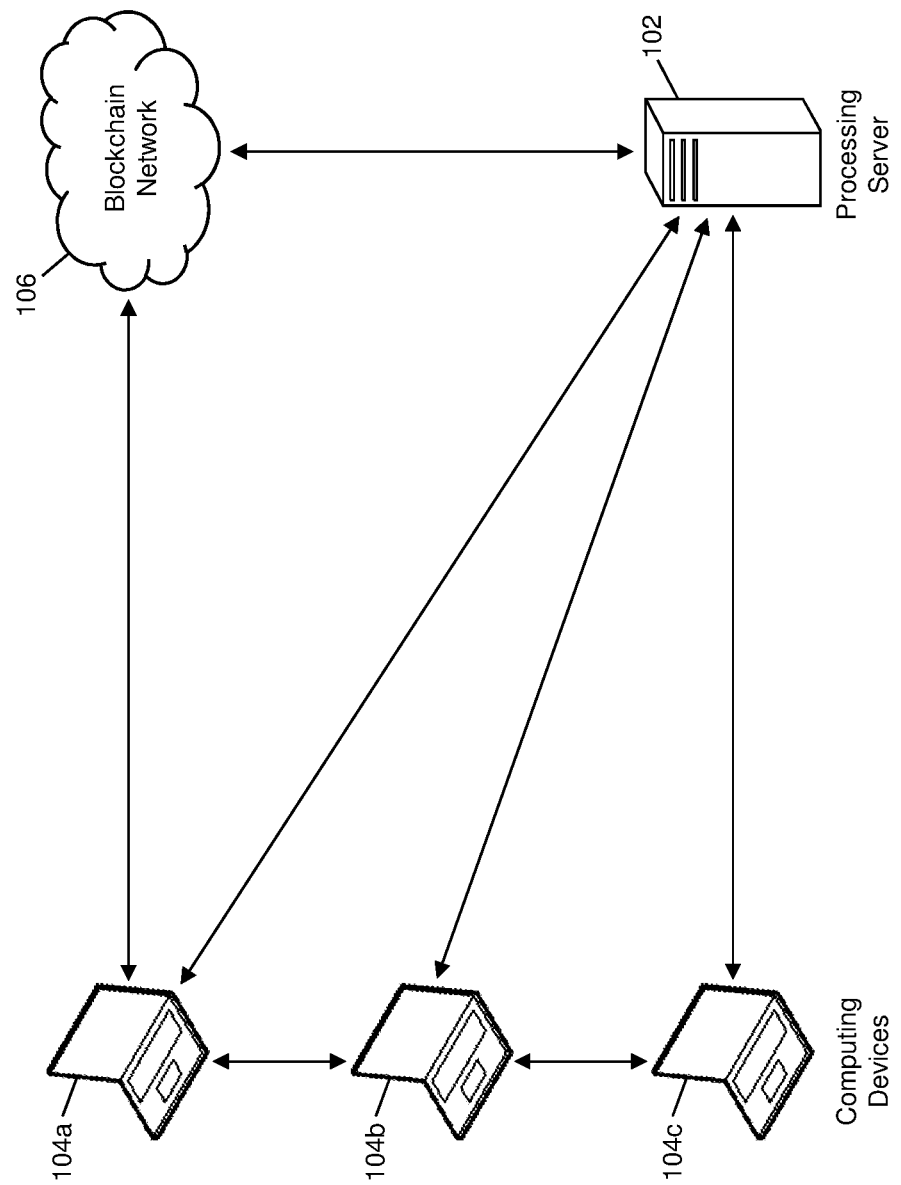
FIG. 1 is a block diagram illustrating a high level system architecture for the distribution of keys to multiple entities for negotiation of reward ownership in accordance with exemplary embodiments.

FIG. 1 illustrates a system 100 for the transfer of cryptographic keys using elliptic curve cryptography for use in the secure transfer of data.

The system 100 may include a processing server 102. The processing server 102, discussed in more detail below, may be configured to generate multiple cryptography keys for distributing using elliptic curve cryptography that are used in the accessibility of data by a plurality of computing devices 104. This is done in a way that requires processing on a computer specifically programmed to carry out the functions discloses herein that are not capable of being performed on a general purpose computer, and cannot be done in a realistic way through mental process or with pencil and paper, to thereby provide a technical solution in negotiating reward ownership in the secure transfer of data. The processing server 102 may receive an access key request, which may request a plurality of keys for distribution to computing devices 104 for use in the access of data. The access key request may be received from an external device, such as another computing device or system, such as via an electronic transmission from such a device or system using a suitable communication network (e.g., a local area network, wide area network, radio frequency, Bluetooth, near field communication, the Internet, etc.), or may be received via one or more input devices interfaced with the processing server 102, such as may be accessed by a user of the processing server 102. The access key request may specify a number, n, of computing devices 104 for which access keys are requested. In the example illustrated in FIG. 1, the access key request may be for three access keys.

The processing server 102 may then generate the requested number, n, of key pairs. Each key pair may comprise of a private key and a public key, herein referred to as a "reward" key pair comprising a "reward" private key and public key. The processing server 102 may use a suitable key pair generation algorithm in the generation of the requested number of key pairs. In an exemplary embodiment, key pair generation algorithm may be an elliptic curve key agreement scheme. In a further embodiment, the elliptic curve Diffie-Hellman (ECDH) key agreement protocol may be used in the generation of each of the n key pairs, as can be appreciated by one skilled in the art. In any instance, the key pair generation algorithm may be one suitable for the use of shared secrets, as discussed in more detail below.

Once the n number of reward key pairs have been generated, the processing server 102 may derive an access private key by applying the reward private key from each of the n reward key pairs to a key derivation algorithm. In some embodiments, the key derivation algorithm may include the use of an XOR logical operation. In exemplary embodiments, the key derivation algorithm may be such that variance in ordering or sequencing of the reward private keys in derivation of the access private key may result in the same access private key. In such embodiments, any entity in possession of each of the reward private keys, and with knowledge of the key derivation algorithm used, may be able to reproduce the access private key regardless of the ordering or sequencing of the reward private keys.

The processing server 102 may also be configured to generate an access public key corresponding to the derived access. The access public key may be generated via the use of a key pair generation algorithm, which may be the same key pair generation algorithm used to generate the reward key pairs. For instance, in an exemplary embodiment, the processing server 102 may use the ECDH key agreement protocol to generate the access public key as part of a key pair with the derived access private key.

The processing server 102 may use the derived access private key to restrict access to data. Any suitable method for the restriction of access to data using a private key may be used. For instance, in one example the data may be encrypted using the access private key and a suitable encryption algorithm. In another example, the data to which access is restricted may be an amount of blockchain currency available via a blockchain network 106. In such an example, the access public key may be used to generate a destination address for an amount of blockchain currency, where the access private key is used to sign the destination address and provide access to the blockchain currency associated therewith. The use of key pairs for transfer and access of blockchain currency using a blockchain network 106 will be apparent to persons having skill in the relevant art.

Once the processing server 102 has restricted access to the desired data using the access private key, the processing server 102 may electronically transmit a reward private key to each of the computing devices 104 such that each computing device 104 receives a different reward private key. For instance, in the example illustrated in FIG. 1, the processing server 102 may generate reward private keys Ka, Kb, and Kc, which may be electronically transmitted to computing devices 104a, 104b, and 104c, respectively. In some embodiments, the reward private keys may be superimposed in a data signal electronically transmitted to the respective computing devices 104 using the Internet or another suitable communication network.

In an exemplary embodiment, the reward private keys may be encrypted prior to transmission using a shared secret. In such an embodiment, the processing server 102 and each of the computing devices 104 may generate key pairs for use in the transfer, encryption, and decryption of the reward private keys via shared secrets. The processing server 102 and computing devices 104 may each generate a key pair using the same key pair generation algorithm, which may be the ECDH key agreement protocol or other algorithm suitable for use in conjunction with shared secrets. Using the key pair generation algorithm, the processing server 102 may generate a key pair referred to herein as a "transfer" key pair comprising a "transfer" private key and public key. Each computing device 104 may generate a key pair using the key pair generation algorithm referred to herein as a "device" key pair comprising a "device" private key and public key. Each computing device 104 may electronically transmit their associated device public key to the processing server 102 using a suitable communication method. The processing server 102 may also electronically transmit the transfer public key to each of the computing devices 104. In some instances, the transfer public key may be transmitted with (e.g., in the same or an accompanying transmission) the encrypted reward private key.

After the processing server 102 has received the device public key from a computing device 104, the processing server 102 may generate a shared secret. The shared secret may be generated using the transfer private key and the device public key in conjunction with the key pair generation algorithm used in the generation of each of the respective keys. The shared secret may be a secret that is equivalent when generated with the private key of a first key pair and public key of a second key pair or when generated with the public key of the first key pair and the private key of the second key pair. For instance, in the illustrated example, the processing server 102 may generate a shared secret for use in conveying the reward private key Ka to the computing device 104a using the transfer private key generated by the processing server 102 and the device public key received from the computing device 104a. The computing device 104a may generate an equivalent shared secret using the transfer public key received from the processing server 102 and the device private key generated by the computing device 104a.

Once the processing server 102 has generated a shared secret associated with a computing device 104 (e.g., using that specific computing device's device public key), the processing server 102 may encrypt the reward private key being conveyed to that computing device 104 using the associated shared secret. Any suitable encryption algorithm may be used, such as the AES256 encryption algorithm. The encrypted reward private key may then be electronically transmitted to the associated computing device 104 using any suitable communication method. In some instances, the processing server 102 may include the transfer public key in the electronic communication used to convey an encrypted reward private key.

Each computing device 104 may generate a shared secret for use in decrypting the received encrypted reward private key. The shared secret may be generated using the transfer public key electronically transmitted by the processing server 102 and the computing device's generated device private key. The shared secret may be generated using the key pair generation algorithm used by the computing device 104 and processing server 102 in the generation of the corresponding key pairs. The computing device 104 may use the shared secret to decrypt the reward private key using the appropriate encryption algorithm used by the processing server 102. For example, the computing device 104 may use the AES256 algorithm in the decryption of the reward private key using the shared secret.

Once each computing device 104 has received and decrypted, if applicable, their respective reward private key, the computing devices 104 may negotiate for possession of each of the reward private keys. In some instances, users associated with the computing devices 104 may negotiate for possession of the reward private keys without use of the computing devices 104. For instance, in the illustrated example three users of the computing devices 104 may negotiate offline to agree that the user of computing device 104a will collect each of the reward private keys. In such an instance, the computing devices 104b and 104c may electronically transmit their reward private key to the computing device 104a using a suitable communication method.

In some embodiments, reward private keys may be transferred among the computing devices 104 using shared secrets. In such embodiments, the computing devices 104 may exchange their associated device public keys for use in generating shared secrets for the encryption of reward private keys for transfer. For example, the computing device 104b may generate a shared secret to encrypt the reward private key Kb using the device private key generated by the computing device 104b and the device public key generated by the computing device 104a, and encrypt the reward private key Kb with the shared secret. The computing device 104b may electronically transmit the encrypted reward private key Kb to the computing device 104a using a suitable communication method. The computing device 104a may generate a shared secret using the device private key generated by the computing device 104a and the device public key generated by the computing device 104b, and decrypt the reward private key Kb. The computing devices 104a and 104c may repeat the process for the computing device 104a to receive and decrypt the reward private key Kc.

Once a computing device 104 has possession of each of the reward private keys, the computing device 104 may derive the access private key using the key derivation algorithm used by the processing server 102 in the derivation thereof. The computing device 104 may use the access private key to access the data being transferred. For instance, if the data is blockchain currency associated with the blockchain network 106, the computing device 104 may use the access private key as a signature to access the blockchain currency transferred to the destination address generated using the access public key.

The methods and systems discussed herein may enable the transfer of data that is accessible using a single private key that must be derived via a plurality of keys distributed to multiple entities. By using keys distributed to multiple entities, the data may remain secured until negotiation by the multiple entities is performed, without participation required by the transferring party. In addition, because the access key is derived using the keys distributed to each entity, the data may have a significantly higher level of security than use of a single key, which may provide for greater protection for the data, particularly in instances when the data may be publicly available, but not accessible, such as in a blockchain network 106. The use of elliptic curve cryptography may provide for even greater protection, as even the reward private keys may have an enhanced level of protection in their transfer. As such, the methods and systems discussed herein may provide for greater protection in both the transfer of data and the transfer of keys used in the access of the transferred data.

Use of the methods and systems discussed herein may also be beneficial in the storage of a cryptographic key used to access secure data. For example, an entity may have data to be securely stored, and may use the methods discussed herein to generate a single private key to encrypt the data, where the reward private keys used to derive the single private key are distributed to a plurality of different computing systems and the single private key is discarded. In such instances, if a cryptographic key store for one of the computing systems is compromised, the data may still be secure as the entity that gains access to the reward private key will be unable to derive the single private key used to encrypt the data. The compromised private key can be provided to the other computing systems, and the single private key derived therefrom and the process repeated to generate a new set of reward private keys. In such an instance, the data may remain secure any time any cryptographic key store is compromised. As such, the methods discussed herein may be beneficial to provide for secure, distributed cryptographic key storage.

Processing Server

Figure 2:
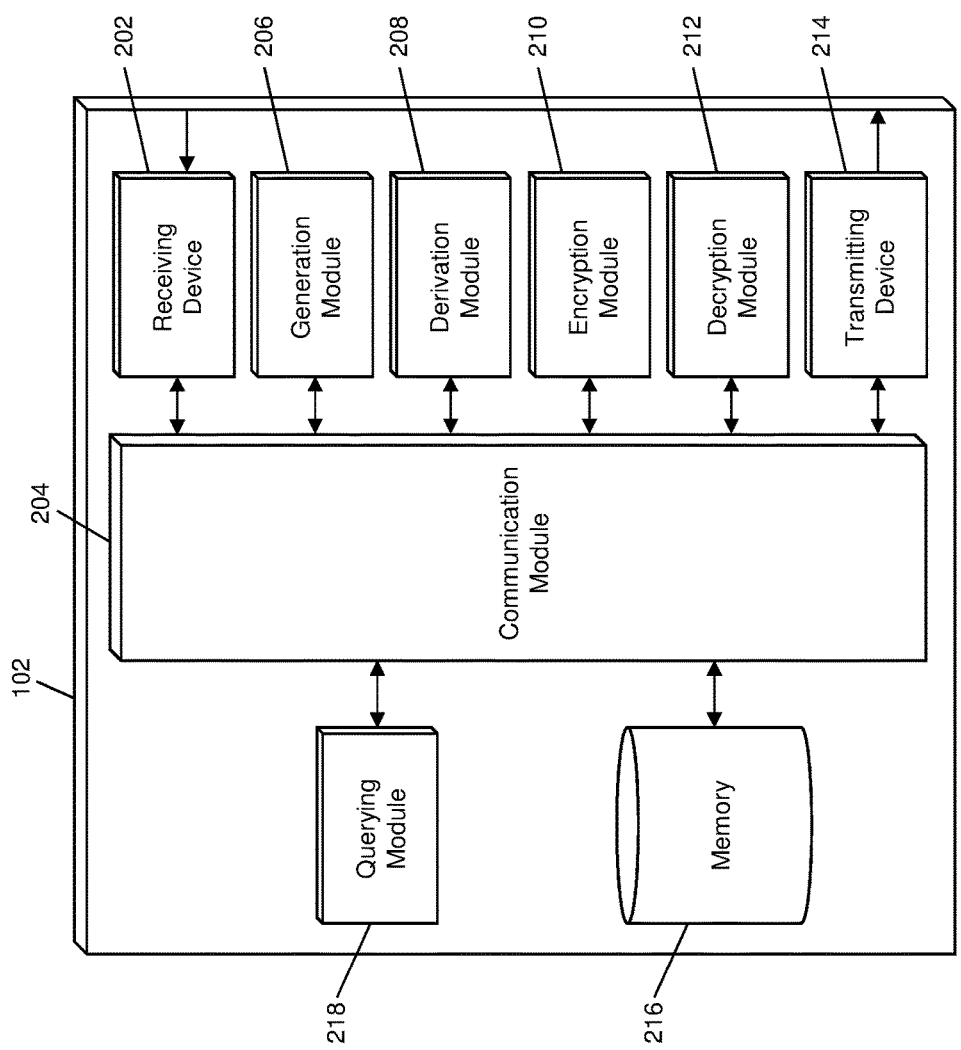
FIG. 2 is a block diagram illustrating the processing server of FIG. 1 for the distribution of cryptographic keys to multiple entities for use in negotiating reward ownership in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may also be configured to receive data from computing devices 104, blockchain networks 106, and other entities via suitable communication networks, such as local area networks, wide area networks, radio frequency networks, the Internet. In some embodiments, the receiving device 202 may be comprised of multiple devices, such as different receiving devices for receiving data over different networks, such as a first receiving device for receiving data over near field communication and a second receiving device for receiving data over the Internet. The receiving device 202 may receive data signals that are electronically transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104 for use in performing the functions discussed herein. Data signals electronically transmitted by the computing devices 104 may be superimposed with device public keys, such as for use in generating shared secrets. The receiving device 202 may also receive data signals from additional devices and systems, such as from the blockchain network 106 and/or nodes associated therewith for use in the transfer of data (e.g., blockchain currency) via the blockchain network 106, and such as an external computing device submitting an access key request. In some instances, the receiving device 202 may receive a data signal superimposed with an access key request for n reward private keys for accessing data from a computing device 104 to receive one of the reward private keys.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 206, derivation module 208, encryption module 210, decryption module 212, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a querying module 218. The querying module 218 may be configured to execute queries on databases to identify information. The querying module 218 may receive one or more data values or query strings, and may execute a query string based thereon on an indicated database, such as a memory 216, to identify information stored therein. The querying module 218 may then output the identified information to an appropriate engine or module of the processing server 102 as necessary. The querying module 218 may, for example, execute a query on the memory 216 to identify one or more keys received from a computing device 104 or generated by the processing server 102 for use in the methods discussed herein.

The processing server 102 may include a generation module 206. The generation module 206 may be configured to generate key pairs and shared secrets. The generation module 206 may receive a request as input, which may request the generation of a key pair or shared secret and may include information for use in conjunction therewith. The generation module 206 may perform the requested functions and may output the requested data for use by another module or engine of the processing server 102. For example, the generation module 206 may be configured to generate key pairs, such as reward key pairs, using a key pair generation algorithm as included or otherwise indicated (e.g., and identified in the memory 216 via the querying module 218)

in the request. The generation module 206 may also be configured to generate a shared secret using a public key and private key from two different key pairs, which may utilize the same key pair generation algorithm. In some instances, the generation module 206 may also be configured to generate a public key corresponding to a private key using the key pair generation algorithm. In an exemplary embodiment, the ECDH key agreement protocol may be used by the generation module 206.

The processing server 102 may further include a derivation module 208. The derivation module 208 may be configured to derive public and/or private keys. The derivation module 208 may receive one or more keys as well as a key derivation algorithm or indication thereof as input, may derive a requested key or keys, and may output the requested key or keys for use by another module or engine of the processing server 102. For example, the derivation module 208 may receive a plurality of reward private keys generated by the generation module 306 and may derive a corresponding access private key based thereon using a suitable key derivation algorithm. In some embodiments, the derivation module 208 may use an algorithm such that an ordering or sequencing of the reward private keys may be inconsequential in that a variance to the order of use of the reward private keys in the derivation may result in the same access private key. In such an embodiment, the key derivation algorithm may include the use of an XOR logical operation.

The processing server 102 may also include an encryption module 210. The encryption module 210 may be configured to encrypt data using suitable encryption algorithms, such as the AES256 algorithm. The encryption module 210 may receive data to be encrypted and a key for use thereof as input, may encrypt the data using a suitable algorithm, and may output the encrypted data to another module or engine of the processing server 102 for use thereof. In some instances, the encryption module 210 may receive the encryption algorithm or indication thereof as input. In other instances, the encryption module 210 may identify the encryption algorithm to be used. The encryption module 210 may, for example, encrypt a reward private key using a shared secret generated in association thereof.

The processing server 102 may also include a decryption module 212. The decryption module 212 may be configured to decrypt data using suitable encryption algorithms, such as the AES256 algorithm. The decryption module 212 may receive data to be decrypted and a key for use thereof as input, may decrypt the data using a suitable algorithm, and may output the decrypted data to another module or engine of the processing server 102 for use thereof. The input provided to the decryption module 212 may include the encryption algorithm to use, or may include an indication thereof, such as an indication for use in identifying an encryption algorithm stored in the memory 216 via a querying module 218. The decryption module 212 may, for example, decrypt keys provided by computing devices 104 using associated shared secrets.

In some embodiments, the processing server 102 may include additional modules or engines for use in performing the functions discussed herein. For example, the processing server 102 may include additional modules for use in conjunction with a blockchain network 106, such as for initiating and submitting blockchain transactions and for signing addresses and transaction requests for transferring blockchain currency using the blockchain network 106. In some instances, the modules of the processing server 102 illustrated in FIG. 2 and discussed herein may be configured to perform additional functions in association thereof. For example, the generation module 206 may be configured to generate a blockchain destination address using the access public key.

The processing server 102 may also include a transmitting device 214. The transmitting device 214 may be configured to transmit data over one or more networks via one or more network protocols. In some instances, the transmitting device 214 may be configured to transmit data to computing devices 104, blockchain networks 106, and other entities via suitable communication networks, such as local area networks, wide area networks, radio frequency networks, the Internet. In some embodiments, the transmitting device 214 may be comprised of multiple devices, such as different transmitting devices for transmitting data over different networks, such as a first transmitting device for transmitting data over near field communication and a second transmitting device for transmitting data over the Internet. The transmitting device 214 may electronically transmit data signals that have data superimposed that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to computing devices 104 that are superimposed with public and/or private keys, which may, in some instances, be encrypted using shared secrets. For example, the transmitting device 214 may be configured to transmit data signals superimposed with encrypted reward private keys to computing devices 104, which may also be superimposed with a transfer public key for use by the computing devices 104 in generating a shared secret. The transmitting device 214 may also be configured to transmit data signals to blockchain networks 106 for use in transferring blockchain currency.

The processing server 102 may also include the memory 216. The memory 216 may be configured to store data for use by the processing server 102 in performing the functions discussed herein. The memory 216 may be configured to store data using suitable data formatting methods and schema and may be any suitable type of memory, such as read-only memory, random access memory, etc. The memory 216 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. The memory 216 may be configured to store the key pair generation algorithms, key derivation algorithms, and encryption algorithms for use in performing the functions of the processing server 102 discussed herein.

Derivation of an Access Private Key

Figure 3:
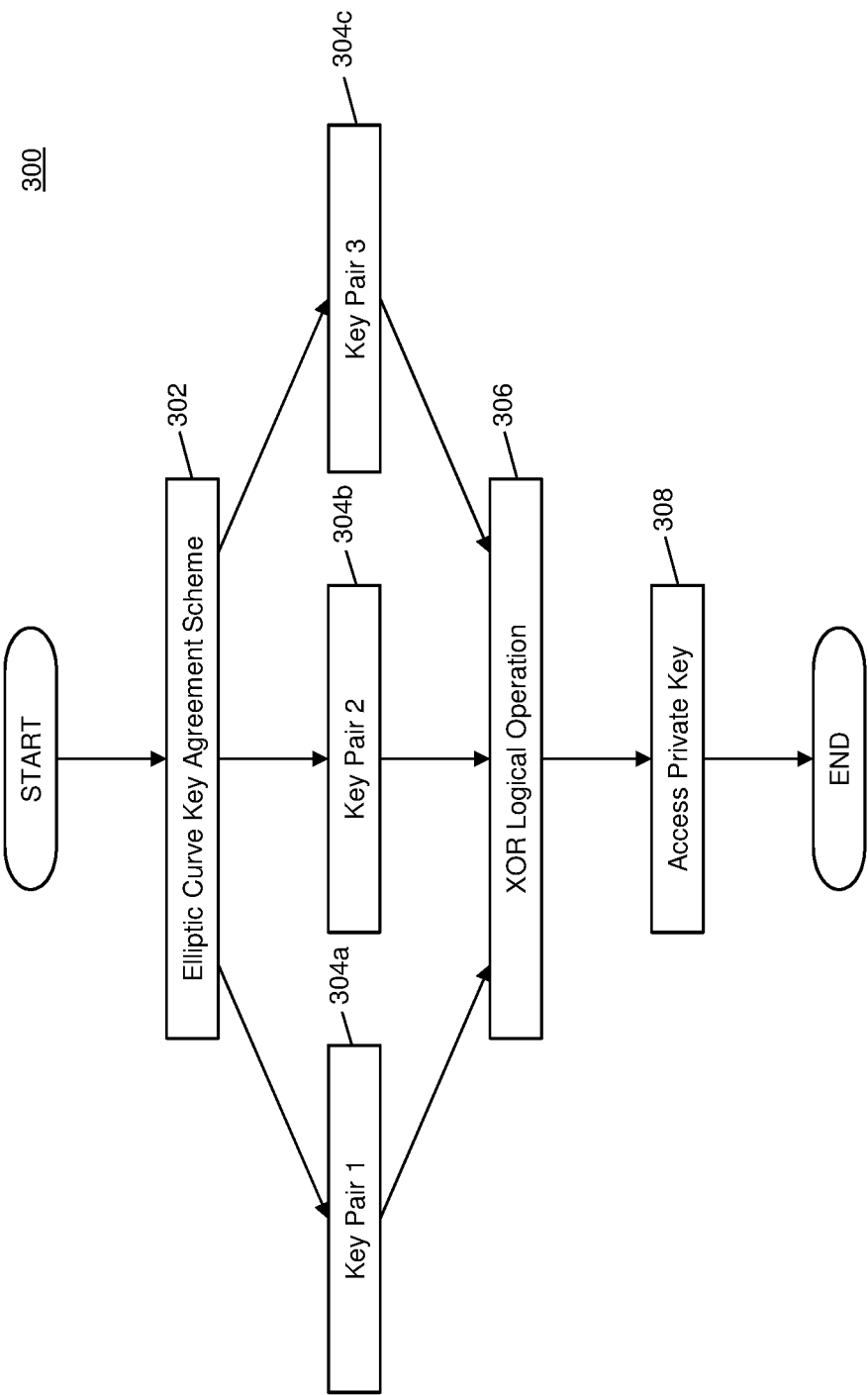
FIG. 3 is a flow diagram illustrating the generation of an access key by the processing server of FIG. 2 for securing data for negotiation of ownership by multiple entities in accordance with exemplary embodiments.

FIG. 3 illustrates a process 300 for the derivation of an access private key for use in accessing data via multiple cryptographic keys generated for distribution to a plurality of computing devices 104.

In step 302, the generation module 206 of the processing server 102 may generate a plurality of reward key pairs 304 using a suitable key pair generation algorithm, which may be an elliptic curve key agreement scheme, such as the ECDH key agreement protocol. The number of reward key pairs 304 generated by the generation module 206 may be based on an access key request as received by the receiving device 202 of the processing server 102 or one or more input devices interfaced with the processing server 102.

In the example illustrated in FIG. 3, the generation module 206 may generate three reward key pairs 304, illustrated in FIG. 3 as key pair 1 304a, key pair 2 304b, and key pair 3 304c. Each reward key pair 304 may comprise a reward private key and a corresponding reward public key. In step 306, the derivation module 208 of the processing server 102 may use an XOR logical operation with the reward private key from each of the reward key pairs 304 to derive an access private key 308. By using the XOR logical operation, the order of operations for deriving the access private key 308 may be inconsequential as to the derived access private key. For instance, in the process 300 illustrated in FIG. 3, the key pairs 304 may include three reward private keys R1, R2, and R3. The access private key 308 derived using an XOR logical operation 306 of all three keys via XOR(R1, XOR(R2, R3)) may be equivalent to access private keys 308 derived via the operations XOR(R2, XOR (R1, R3)) and XOR (R3, XOR(R1, R2)).

The resulting access private key 308 may then be used by the processing server 102 in the restriction of access to data. For example, the access private key 308 may be used to encrypt data, or may be used to sign a destination address for receiving blockchain currency associated with a blockchain network 106. The reward private keys included in each reward key pair 304 may be distributed among the computing devices 104 as a means for providing access to the restricted data. For distributed cryptographic key storage, an entity may use the access private key 308 to encrypt or otherwise restrict access to data, may discard the access private key 308, and may then distribute the reward private key in each reward key pair 304 to a computing device 104, which may be part of the entity (e.g., a subsidiary or controlled computing system) or may be an associated, trusted entity. In such instances, if the key storage for any computing device 104 is compromised, the data may remain secure.

Process for Transferring Keys Via Elliptic Curve Cryptography for Data Access

Figure 4:
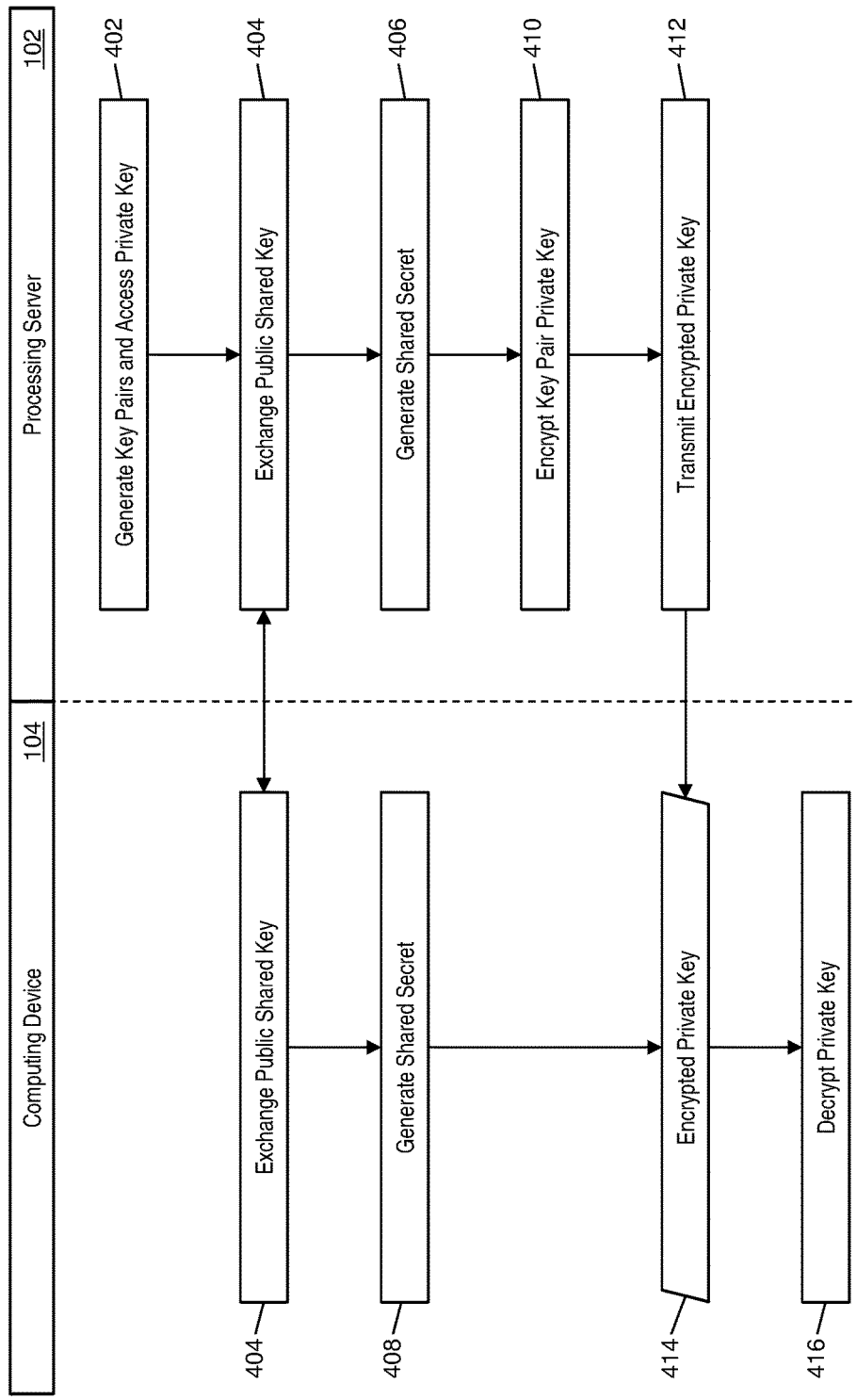
FIG. 4 is a flow diagram illustrating a process flow for the transfer of an access key using elliptic curve cryptography in accordance with exemplary embodiments.

FIG. 4 illustrates a process for the distribution of private keys via elliptic curve cryptography, such as for the distribution of reward private keys generated using the process 300 illustrated in FIG. 3 used in the derivation of an access private key used to access data.

In step 402, the processing server 102 may generate a plurality of reward key pairs and derive therefrom an access private key, such as using the process 300 illustrated in FIG. 3 and discussed above. In step 404, the processing server 102 and a computing device 104 may exchange public keys for use in generating shared secrets. The computing device 104 may generate a device key pair using a key pair generation algorithm, such as the ECDH key agreement protocol, which may comprise a device private key and a device public key. The generation module 206 of the processing server 102 may generate a transfer key pair using the same key pair generation algorithm, resulting in a transfer private key and a transfer public key. The exchange of public keys may include the electronic communication of the device public key from the computing device 104 to the processing server 102 and of the transfer public key from the processing server 102 (e.g., via the transmitting device 214) to the computing device 104.

In step 406, the generation module 206 of the processing server 102 may generate a shared secret. The shared secret may be generated using the same key pair generation algorithm, such as the ECDH key agreement protocol, using the transfer private key generated by the generation module 206 and the device public key received from the computing device 104. In step 406, the computing device 104 may generate an equivalent shared secret using the same key pair generation algorithm using the device private key generated previously by the computing device 104 and the transfer public key received from the processing server 104.

In step 410, the encryption module 210 of the processing server 104 may encrypt the reward private key generated in step 402 and used in the derivation of the access private key via a suitable encryption algorithm using the shared secret. The encryption algorithm may be, for example, the AES256 algorithm. In step 412, the transmitting device 214 of the processing server 102 may electronically transmit a data signal superimposed with the encrypted reward private key to the computing device 104 using a suitable communication network and protocol.

In step 414, the computing device 104 may receive the data signal and may parse the encrypted reward private key therefrom. In step 416, the computing device 104 may decrypt the reward private key. The reward private key may be decrypted using the same encryption algorithm used by the processing server 102 using the shared secret. The decrypted reward private key may then be used in deriving the access private key when combined with the other reward private keys (e.g., received from other computing devices 104) using the appropriate key deriving algorithm.

Figure 5:
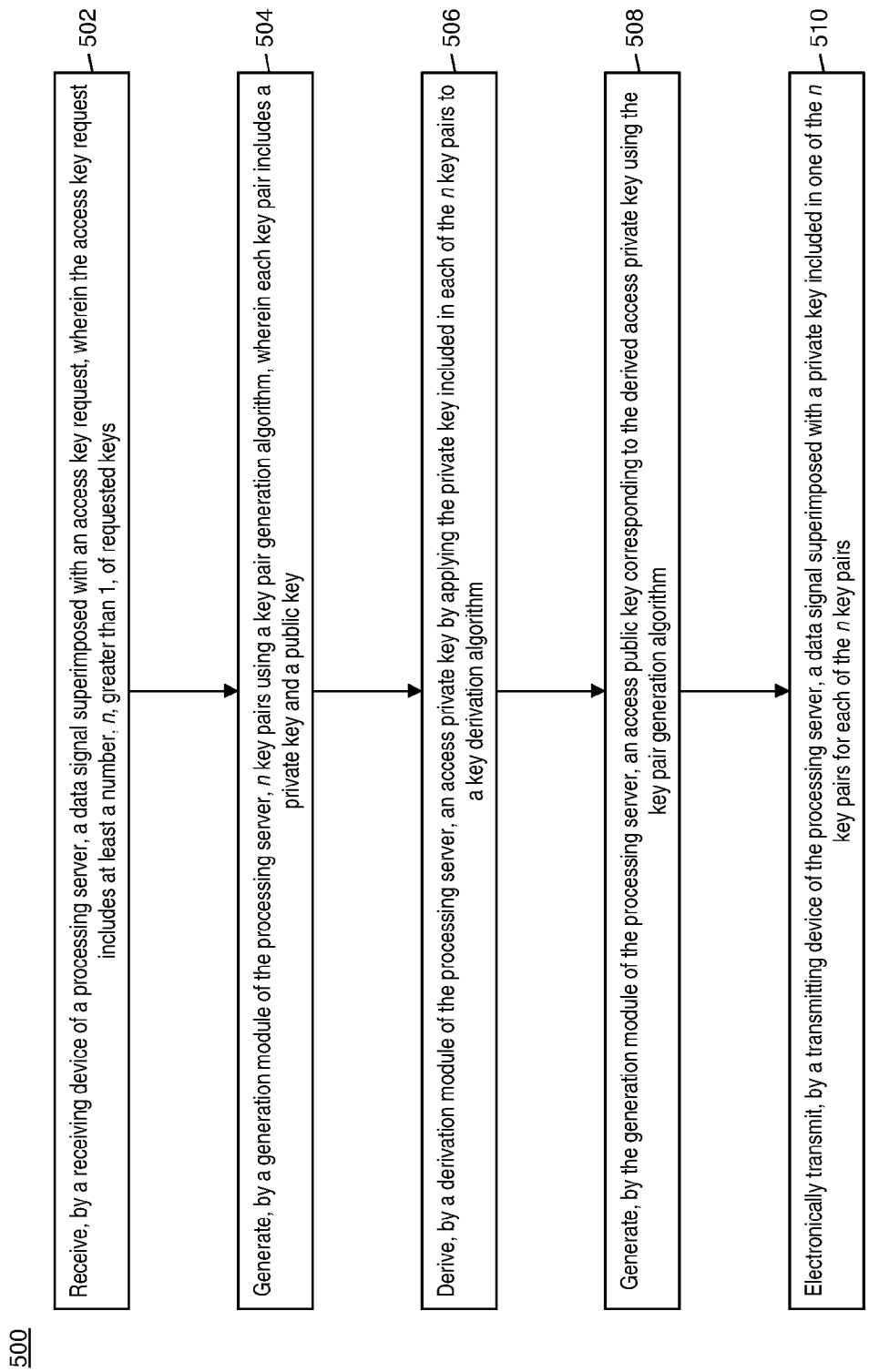
FIG. 5 is a flow chart illustrating an exemplary method for distributing multiple cryptographic keys used to access data in accordance with exemplary embodiments.

Exemplary Method for Distributing Multiple Cryptographic Keys Used to Access Data FIG. 5 illustrates a method 500 for distributing multiple cryptographic keys to a plurality of computing devices that can be used to derive an access key for accessing data.

In step 502, a data signal superimposed with an access key request may be received by a receiving device (e.g., the receiving device 202) of a processing server (e.g., the processing server 102), wherein the access key request includes at least a number, n, greater than 1, of requested keys. In step 504, n key pairs may be generated by a generation module (e.g., the generation module 206) of the processing server using a key pair generation algorithm, wherein each key pair includes a private key and a public key.

In step 506, an access private key may be derived by a derivation module (e.g., the derivation module 208) of the processing server by applying the private key included in each of the n key pairs to a key derivation algorithm. In step 508, an access public key corresponding to the derived access private key may be generated by the generation module of the processing server using the key pair generation algorithm. In step 510, a data signal superimposed with a private key included in one of the n key pairs may be electronically transmitted by a transmitting device (e.g., the transmitting device 214) of the processing server for each of the n key pairs.

In one embodiment, the method 500 may also include: storing, in a memory (e.g., the memory 216) of the processing server, a transfer key pair including a transfer public key and a transfer private key; receiving, by the receiving device of the processing server, a data signal superimposed with a shared public key from each of n computing devices (e.g., computing devices 104); generating, by the generation module of the processing server, n shared secrets, wherein each shared secret is generated using a shared public key of the n shared public keys and the transfer private key and the key pair generation algorithm; and encrypting, by an encryption module (e.g., the encryption module 210) of the processing server, the private key included in each of the n key pairs with one of the n shared secrets using an encryption algorithm, wherein the private key included superimposed in the electronically transmitted data signal is the respective encrypted private key. In a further embodiment, the method 500 may further include electronically transmitting, by the transmitting device of the processing server, a data signal superimposed with the transfer public key to the n computing devices.

In an even further embodiment, the data signal superimposed with the transfer public key may be electronically transmitted to the n computing devices prior to receiving the data signal superimposed with the shared public key. In another even further embodiment, each data signal superimposed with the transfer public key may be a same data signal as each data signal superimposed with an encrypted private key. In yet another further embodiment, the transmitted data signal may be electronically transmitted to a node in a blockchain network (e.g., the blockchain network 106) and where the encrypted private key is included in a transaction request that further includes a destination address corresponding to the respective shared public key.

In some embodiments, the key pair generation algorithm may be an elliptic curve key agreement scheme. In further embodiments, the elliptic curve key agreement scheme may be the elliptic curve Diffie-Hellman key agreement protocol. In one embodiment, the key derivation algorithm may include use of an XOR logical operation. In some embodiments, the method 500 may further include electronically transmitting, by the transmitting device of the processing server, a data signal superimposed with a transaction request to a node in a blockchain network, wherein the transaction request includes at least a destination address signed using the derived access private key.

Computer System Architecture

Figure 6:
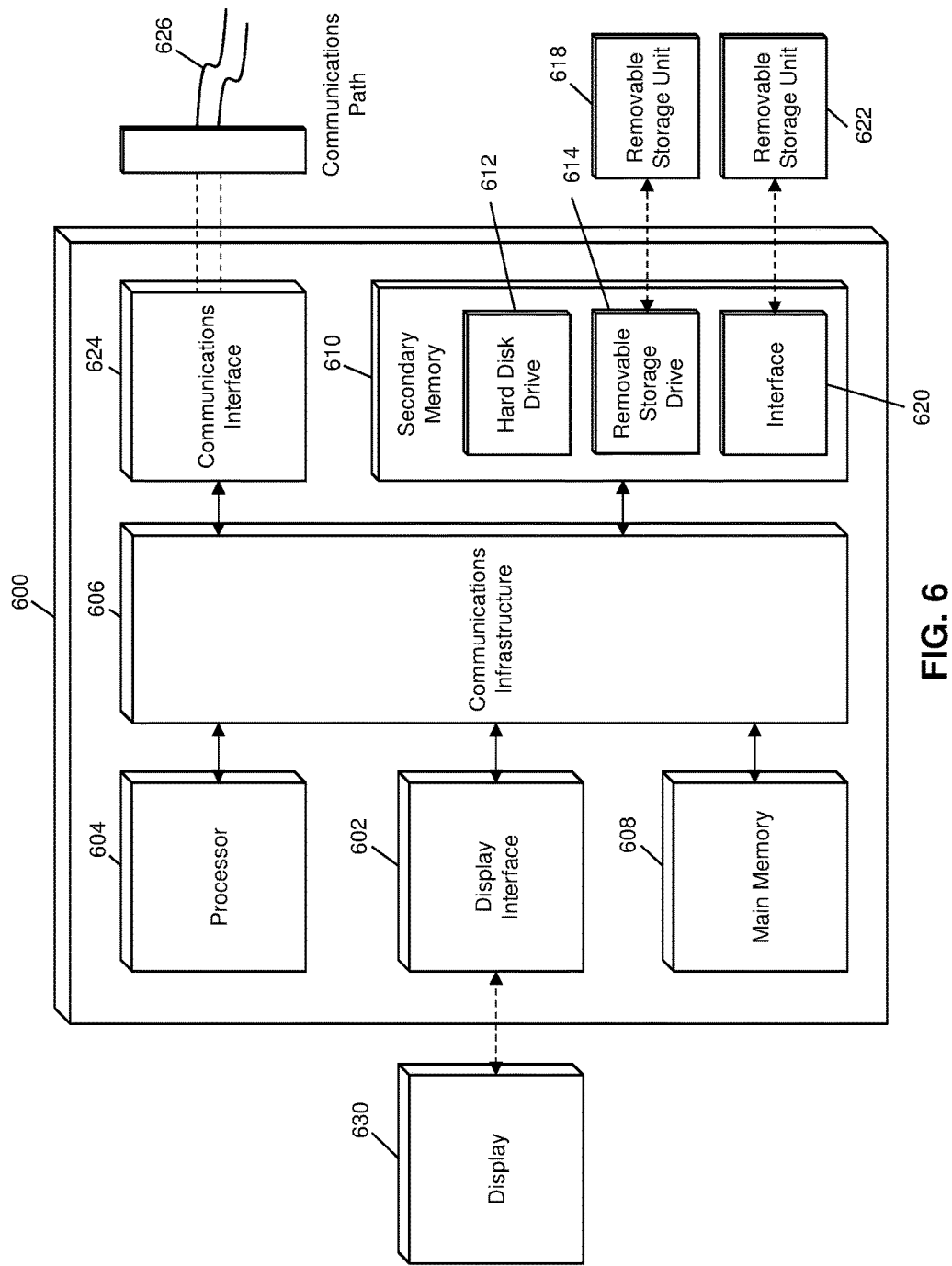
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for distributing multiple cryptographic keys used to access data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for distributing multiple cryptographic keys used to access data, comprising:
   receiving, by a receiving device of a processing server, a data signal superimposed with an access key request, wherein the access key request includes at least a number, n, greater than 2, of requested keys;
   generating, by the processing server, n key pairs using a key pair generation algorithm, wherein each key pair includes a private key and a public key and the key pair generation algorithm is an elliptic curve key agreement scheme;
   deriving, by the processing server, an access private key by applying the private key included in each of the n key pairs to a key derivation algorithm, wherein the key derivation algorithm is at least one XOR logical operation;
   generating, by the processing server, an access public key corresponding to the derived access private key using the key pair generation algorithm; and
   electronically transmitting, by a transmitting device of the processing server, a data signal superimposed with a private key included in one of the n key pairs for each of the n key pairs.

2. The method of claim 1, further comprising:
   storing, in a memory of the processing server, a transfer key pair including a transfer public key and a transfer private key;
   receiving, by the receiving device of the processing server, a data signal superimposed with a shared public key from each of n computing devices;
   generating, by the processing server, n shared secrets, wherein each shared secret is generated using a shared public key of the n shared public keys and the transfer private key and the key pair generation algorithm; and
   encrypting, by the processing server, the private key included in each of the n key pairs with one of the n shared secrets using an encryption algorithm, wherein the private key included superimposed in the electronically transmitted data signal is the respective encrypted private key.

3. The method of claim 2, further comprising:
   electronically transmitting, by the transmitting device of the processing server, a data signal superimposed with the transfer public key to the n computing devices.

4. The method of claim 3, wherein the data signal superimposed with the transfer public key is electronically transmitted to the n computing devices prior to receiving the data signal superimposed with the shared public key.

5. The method of claim 3, wherein each data signal superimposed with the transfer public key is a same data signal as each data signal superimposed with an encrypted private key.

6. The method of claim 2, wherein the transmitted data signal is electronically transmitted to a node in a blockchain network and where the encrypted private key is included in a transaction request that further includes a destination address corresponding to the respective shared public key.

7. The method of claim 1, wherein the elliptic curve key agreement scheme is the elliptic curve Diffie-Hellman key agreement protocol.

8. The method of claim 1, further comprising:
electronically transmitting, by the transmitting device of the processing server, a data signal superimposed with a transaction request to a node in a blockchain network, wherein the transaction request includes at least a destination address signed using the derived access private key.

9. A system for distributing multiple cryptographic keys used to access data, comprising:
a transmitting device of a processing server;
a receiving device of the processing server configured to receive a data signal superimposed with an access key request, wherein the access key request includes at least a number, n, greater than 2, of requested keys; and
a processor of the processing server configured to
generate n key pairs using a key pair generation algorithm, wherein each key pair includes a private key and a public key and the key pair generation algorithm is an elliptic curve key agreement scheme,
derive an access private key by applying the private key included in each of the n key pairs to a key derivation algorithm, wherein the key derivation algorithm is at least one XOR logical operation, and
the generation module of the processing server is further configured to generate an access public key corresponding to the derived access private key using the key pair generation algorithm, wherein
the transmitting device of the processing server is configured to electronically transmit a data signal superimposed with a private key included in one of the n key pairs for each of the n key pairs.

10. The system of claim 9, further comprising:
a memory of the processing server configured to store a transfer key pair including a transfer public key and a transfer private key, wherein the receiving device of the processing server is further configured to receive a data signal superimposed with a shared public key from each of n computing devices,
the processor of the processing server is further configured to generate n shared secrets, wherein each shared secret is generated using a shared public key of the n shared public keys and the transfer private key and the key pair generation algorithm, and encrypt the private key included in each of the n key pairs with one of the n shared secrets using an encryption algorithm, and
the private key included superimposed in the electronically transmitted data signal is the respective encrypted private key.

11. The system of claim 10, wherein the transmitting device of the processing server is further configured to electronically transmit a data signal superimposed with the transfer public key to the n computing devices.

12. The system of claim 11, wherein the data signal superimposed with the transfer public key is electronically transmitted to the n computing devices prior to receiving the data signal superimposed with the shared public key.

13. The system of claim 11, wherein each data signal superimposed with the transfer public key is a same data signal as each data signal superimposed with an encrypted private key.

14. The system of claim 10, wherein the transmitted data signal is electronically transmitted to a node in a blockchain network and where the encrypted private key is included in a transaction request that further includes a destination address corresponding to the respective shared public key.

15. The system of claim 1, wherein the elliptic curve key agreement scheme is the elliptic curve Diffie-Hellman key agreement protocol.

16. The system of claim 9, wherein the transmitting device of the processing server is further configured to electronically transmit a data signal superimposed with a transaction request to a node in a blockchain network, wherein the transaction request includes at least a destination address signed using the derived access private key.

* * * * *